(12) United States Patent
Ju et al.

(10) Patent No.: US 11,872,104 B2
(45) Date of Patent: Jan. 16, 2024

(54) IMPLANT SURFACE MODIFICATION TREATMENT DEVICE

(71) Applicant: WONIK QNC CORPORATION, Gumi-si (KR)

(72) Inventors: Yoon Gwan Ju, Daejeon (KR); Byung No Choi, Daegu (KR); Geon Rae Kim, Gumi-si (KR); Jae Hee Jung, Gumi-si (KR)

(73) Assignee: WONIK QNC CORPORATION, Gyeongsangbuk-do (KR)

( * ) Notice: Subject to any disclaimer, the term of this patent is extended or adjusted under 35 U.S.C. 154(b) by 692 days.

(21) Appl. No.: 17/053,055

(22) PCT Filed: Jul. 12, 2018

(86) PCT No.: PCT/KR2018/007898
§ 371 (c)(1),
(2) Date: Nov. 4, 2020

(87) PCT Pub. No.: WO2019/216485
PCT Pub. Date: Nov. 14, 2019

(65) Prior Publication Data
US 2021/0361392 A1 Nov. 25, 2021

(30) Foreign Application Priority Data
May 8, 2018 (KR) .................... 10-2018-0052417

(51) Int. Cl.
*A61C 8/00* (2006.01)
*A61C 19/06* (2006.01)

(52) U.S. Cl.
CPC .......... *A61C 8/0012* (2013.01); *A61C 8/0087* (2013.01); *A61C 19/06* (2013.01)

(58) Field of Classification Search
CPC ...... A61C 8/0012; A61C 8/0087; A61C 19/06
See application file for complete search history.

(56) References Cited

U.S. PATENT DOCUMENTS

| 4,837,484 | A | 6/1989 | Eliasson et al. |
| 5,118,989 | A | 6/1992 | Egermeier et al. |

(Continued)

FOREIGN PATENT DOCUMENTS

| CN | 2063631 U | 10/1990 |
| CN | 101133475 A | 2/2008 |

(Continued)

OTHER PUBLICATIONS

Hiroyuki Sugimura, Oxygen assists vacuum-UV micropatterning of organic surfaces, Department of Materials Science and Engineering, Kyoto University, Mar. 31, 2006, 3 pgs.

(Continued)

*Primary Examiner* — Mary Ellen Bowman
(74) *Attorney, Agent, or Firm* — Morgan, Lewis & Bockius LLP (57) ABSTRACT

The present disclosure relates to an implant surface modification treatment device including an internal electrode having a barrel-shaped structure and a surface on which a plurality of transmission parts are formed, an ultraviolet (UV) discharge vessel having a barrel-shaped structure that accommodates the internal electrode and has a gas-filled area filled with a discharge gas that serves as a UV light source, and an external electrode accommodating the UV discharge vessel inside thereof, wherein an implant fixture is placed inside the internal electrode to perform surface modification.

17 Claims, 7 Drawing Sheets

(56) References Cited

U.S. PATENT DOCUMENTS

| | | | |
|---|---|---|---|
| 5,581,152 A | 12/1996 | Matsuno et al. | |
| 5,763,999 A * | 6/1998 | Matsuno | H01J 65/046 |
| | | | 313/634 |
| 6,379,024 B1 * | 4/2002 | Kogure | H01J 61/52 |
| | | | 313/113 |
| 6,398,970 B1 | 6/2002 | Justel et al. | |
| 2001/0022499 A1 | 9/2001 | Inayoshi | |
| 2002/0050780 A1 | 5/2002 | Justel et al. | |
| 2005/0007021 A1 | 1/2005 | Justel et al. | |
| 2005/0168124 A1 | 8/2005 | Justel et al. | |
| 2005/0271831 A1 | 12/2005 | Takakuwa | |
| 2008/0061667 A1 * | 3/2008 | Gaertner | H01J 65/046 |
| | | | 313/113 |
| 2008/0258601 A1 | 10/2008 | Justel et al. | |
| 2013/0062535 A1 | 3/2013 | Park et al. | |
| 2013/0189642 A1 | 7/2013 | Ogawa | |
| 2013/0221236 A1 | 8/2013 | Mastenbroek et al. | |
| 2013/0264495 A1 | 10/2013 | Ogawa | |
| 2016/0302906 A1 | 10/2016 | Lam et al. | |
| 2019/0159874 A1 * | 5/2019 | Jung | B65D 81/28 |

FOREIGN PATENT DOCUMENTS

| | | |
|---|---|---|
| CN | 101599414 A | 12/2009 |
| CN | 203169336 U | 9/2013 |
| CN | 103370031 A | 10/2013 |
| CN | 105025840 A | 11/2015 |
| DE | 10209191 A1 | 3/2002 |
| DE | 10200902823 A1 † | 12/2009 |
| DE | 102009022823 A1 | 12/2009 |
| EP | 1048620 B1 | 4/2000 |
| EP | 1154461 A1 | 5/2001 |
| EP | 2965714 A1 | 1/2016 |
| EP | 3266411 A1 † | 1/2018 |
| JP | 2705023 B2 | 1/1998 |
| JP | 2007095449 A | 4/2007 |
| JP | 2008-506230 A | 2/2008 |
| JP | 2009-295468 A | 12/2009 |
| JP | 2012000118 A | 1/2012 |
| JP | 2012-075548 A | 4/2012 |
| JP | 2012-157412 A | 8/2012 |
| JP | 2012-157413 A | 8/2012 |
| JP | 5074381 B2 | 11/2012 |
| JP | 5918775 B2 | 5/2016 |
| JP | 2016-137054 A | 8/2016 |
| JP | 2016-146295 A | 8/2016 |
| JP | 2016-159084 A | 9/2016 |
| JP | 2017-501771 A | 1/2017 |
| JP | 2018-46957 A | 3/2018 |
| JP | 2018-51106 A † | 4/2018 |
| JP | 2018-051106 A | 4/2018 |
| JP | 6541362 B2 | 7/2019 |
| KR | 10-2001-0051998 A | 6/2001 |
| KR | 10-2004-0057666 A | 7/2004 |
| KR | 20-0367905 Y1 † | 11/2004 |
| KR | 10-2005-0090518 A | 9/2005 |
| KR | 10-0979192 B1 | 2/2006 |
| KR | 100552039 B1 | 2/2006 |
| KR | 10-2008-0002628 A | 1/2008 |
| KR | 10-0912272 B1 | 8/2009 |
| KR | 10-0926354 B1 | 11/2009 |
| KR | 10-2007-0070055 A | 12/2010 |
| KR | 10-1174837 B1 | 12/2011 |
| KR | 10-1246431 B1 | 3/2013 |
| KR | 10-1308205 B1 | 9/2013 |
| KR | 10-1445819 B1 | 9/2014 |
| KR | 10-1675508 B1 | 10/2015 |
| KR | 10-2016-0049683 A | 5/2016 |
| KR | 2016-0049683 A | 5/2016 |
| KR | 20160058071 A | 5/2016 |
| KR | 10-2016-0081880 A | 7/2016 |
| KR | 10-1675508 B1 | 11/2016 |
| KR | 10-1688935 B1 | 1/2017 |
| KR | 10-1705802 B1 | 2/2017 |
| KR | 10-2017-0113005 A | 10/2017 |
| KR | 10-1797158 B1 | 11/2017 |
| KR | 10-2018-0037711 A | 4/2018 |
| KR | 2018-0037711 A | 4/2018 |
| KR | 10-1861827 B1 | 5/2018 |
| KR | 10-1904017 B1 | 10/2018 |
| TW | 543074 B | 7/2003 |
| WO | WO 2013042700 A1 | 3/2013 |
| WO | WO 2015/192259 A1 | 12/2015 |
| WO | WO 2016/140014 A1 | 9/2016 |
| WO | WO 2017/191925 A1 | 11/2017 |

OTHER PUBLICATIONS

J. Y. Zhang et al. Photodecomposition of thin palladium acetate films with 126 nm radiation, Department of Electronic and Electrical Engineering, University College London, Jul.1, 1997, 4 pgs.

S. Periyasamy et al. Preparation of a multifunctional mulberry silk fabric having hydrophobic and hydrophilic surfaces using VUV excimer lamp, Surface and Coating Technology, Dec. 20, 2006, 6 pgs.

T. Kasahara et al. Surface Modification of Polyethylene Terephthalate (PET) by 172-nm Excimer Lamp, The Japan Institute of Electronics Packaging, Oct. 11, 2012, 8 pgs.

Yukihiro Morimoto et al. Recent progress on UV lamps for industries, R&D Center, Lamp company Ushio Inc., Oct. 2004, 8 pgs.

Decision rendered by IPTAB, Intellectual Property Trial and Appeal Board 10$^{th}$ Division Decision, Petitioner: Dentis Co., Ltd., Respondent: WONIK QnC Corp., Aug. 27, 2021, 12 pgs.

Thomas, O. & Edward, A. S. (2015). Mercury-free Vacuum-(VUV) and UV Excilamps: Lamps of the Future?: IUVA-News, vol. 7, No. 4, 6 pgs.

Wonik QNC Corporation, Extended European Search Report, EP 18918263.7, dated Nov. 5, 2021, 7 pgs.

Wonik QNC Corporation, Notification of Second Office Action, CN Application No. 201880093039.9, dated Dec. 16, 2021, 29 pgs.

Wonik QNC Corporation, International Search Report, PCT/KR2018/007898, dated Jan. 25, 2019, 2 pgs.

Kantor, Sylvia, "UV light can kill foodborne pathogens on certain fruits", PH, https://phys.org/news/2015-07-uv-foodborne-pathogens-fruits.html, Jul. 28, 2015, 2 pgs.

Time-stamped English Transcript: YouTube vide on UV treatment of food, Title: UV Tunnel—Easy and chemical free disinfection with UV-C light, Channel: Dinics Technologies GmbH, https://www.youtube.com/watch?y=yr3-fnf9dCw, May 12, 2017, 3 pgs.

Time-stamped English Transcript: YouTube vide on UV treatment of food, Title: Ultraviolet Light Tunnel System | Campden BRI, Channel: campdenbri, https://www.youtube.com/watch?y=k4x4k9WQS34, Mar. 30, 2015, 5 pgs.

Choudhary, "Ankur, Difference Between Dynamic and Static Pass Box", Pharmaceutical Guidelines, 2017, 1 pg.

Time-stamped English Transcript: YouTube vide on UV treatment of food, Title: 300—Static Pass box with Interlocking Arrangement and with UV lite, Channel: CMP Metal, https://www.youtube.com/watch?v=Vt61HzTTZeE, Sep. 18, 2015, 3 pgs.

Pass Boxes, Withnell Sensors, https://web.archive.org/web/20171011171937/https://www.withnellsensors.co.uk/pages/products-and-services/climatic-chambers-and-calibration-baths/pass-boxes/, 2017, 3 pgs.

*Wongo Dentis Co., Ltd.* v. *Wonik QNC Co., Ltd.*, Patent Court Decision in the Patent Registration Invalidation Litigation, Case 2021, License 5693, Jun. 17, 2022, 77 pages.

\* cited by examiner
† cited by third party

IMPLANT SURFACE MODIFICATION TREATMENT DEVICE

TECHNICAL FIELD

The present disclosure relates to an implant surface modification treatment device, and more particularly, to an implant surface modification treatment device capable of treating a surface of a dental implant with ultraviolet (UV) light.

BACKGROUND

Recently, the proportion of surgeries to place a dental implant, which is an artificial tooth, has been increasing. The implant is coupled to a fixture inserted into an alveolar bone and serves as a tooth.

Generally, the structure of a dental implant, which is an artificial tooth, is composed of three parts: a fixture (artificial tooth root), an abutment, and a crown (prosthesis, artificial tooth). The material of the fixture is generally titanium or a titanium alloy.

In an implant surgery, the fixture area of the implant which is inserted into the alveolar bone needs to be completely inserted into the alveolar bone.

To this end, in the related art, when a surface of an implant, particularly the fixture, is irradiated with ultraviolet (UV) light, light energy of the UV light and ozone generated due to the UV light cause an implant surface modification phenomenon, which is known to promote proliferation and adhesion functions of bone-forming cells after implant placement and help in achieving a desirable outcome of implant surgery, mainly due to three reasons.

First, the light energy of the UV light and the ozone generated due to the UV light break down and evaporate carbon molecules attached to the implant surface and allow the bone-forming cells to be well-adhered to the implant surface.

Second, the light energy of the UV light and the ozone generated due to the UV light change the charge of the implant surface from negative to positive and electrostatically attract negatively-charged human cells and proteins that help adhesion and function of the cells to the implant surface, thereby allowing the human cells and proteins to be closely bonded to the implant surface.

Third, if the light energy of the UV light and the ozone generated due to the UV light increase hydrophilicity of the implant surface and allow the implant surface to be easily wetted by blood, a blood clot that is well-formed on the implant surface helps the bone-forming cells to adhere well to the implant surface.

However, the related art surface modification treatment method of the surface modification treatment device using the UV light was a structure in which an implant and a light source are spaced a predetermined distance apart and the implant is irradiated with light. Thus, in order to allow the entire surface of the fixture of the implant to be evenly irradiated with the light, the general method was to perform the treatment while maintaining the predetermined distance between the implant and the light source and rotating the implant.

Using such a method, the treatment time required for an implant surface modification treatment takes about 20 to 30 minutes in normal UV light (usually in the UVC wavelength range) and takes about 1 to 2 minutes in 172 nm excimer UV light in the vacuum UV wavelength range.

Korean Patent Publication No. 10-2016-0049683 (Implant Oxide Film Removal Device, published on May 10, 2016) discloses a device that fixes a plurality of implant fixtures in a chamber and then supplies a plasma gas into the chamber to remove an oxide film.

The fixtures are each mounted on a holder, and the device having a structure capable of rotating the fixtures mounted on the holder and evenly removing the oxide film from the fixtures is described.

However, the configuration of the device in the above Patent Publication is very complex, the fixtures should be separated from a storage case and mounted on the holder to allow a surface of each fixture to come in direct contact with the plasma gas, and after the oxide film removal treatment, the fixtures are stored in the storage case again or used immediately for implant surgery.

In this manner, the process in which a user directly takes out the fixtures from the storage case and mounts the fixtures on the holder takes much time, and since simultaneously using a plurality of fixtures in implant surgery is not common, in the case where the fixtures treated to be hydrophilic are stored in the storage case again, there is a problem in that the surfaces of the fixtures may be oxidized again.

SUMMARY

Various embodiments of the present disclosure provide an implant surface modification treatment device capable of minimizing an implant surface modification treatment time with a simplified device configuration.

Various embodiments of the present disclosure also provide an implant surface modification treatment device capable of treating an implant fixture to be hydrophilic in a state in which the implant fixture is accommodated in a storage case, without taking the implant fixture out of the storage case.

An implant surface modification treatment device according to one embodiment of the present disclosure may include an internal electrode having a barrel-shaped structure and a surface on which a plurality of transmission parts are formed, an ultraviolet (UV) discharge vessel having a barrel-shaped structure that accommodates the internal electrode and has a gas-filled area filled with a discharge gas that serves as a UV light source, and an external electrode accommodating the UV discharge vessel inside thereof, wherein an implant fixture is placed inside the internal electrode to perform surface modification.

According to one embodiment of the present disclosure, UV light from the UV light source may be excimer UV light.

According to one embodiment of the present disclosure, UV light from the UV light source may be excimer UV light having a wavelength of 172 nm (that is, 172 nm excimer UV light).

According to one embodiment of the present disclosure, UV light from the UV light source may be excimer UV light having a wavelength of 222 nm (that is, 222 nm excimer UV light).

According to one embodiment of the present disclosure, the UV light source may be a UV light source of a UVC wavelength range.

According to one embodiment of the present disclosure, the implant fixture may be accommodated in a case through which UV light from the UV light source passes.

According to one embodiment of the present disclosure, the case may be made of a synthetic quartz glass material having a transmittance of 60% or higher for UV light having a wavelength of 172 nm when the synthetic quartz glass material has a thickness of 1 mm.

According to one embodiment of the present disclosure, the implant surface modification treatment device may further include a support inserted into the internal electrode to support the implant fixture.

According to one embodiment of the present disclosure, the support may reciprocate inside the internal electrode to allow the implant fixture to be inserted into or discharged from the internal electrode.

According to one embodiment of the present disclosure, the support may rotate inside the internal electrode.

According to one embodiment of the present disclosure, the support may have an air vent hole allowing inflow and outflow of air.

According to one embodiment of the present disclosure, the support may be made of a ceramic material.

According to one embodiment of the present disclosure, the external electrode may have a barrel-shaped structure that reflects generated UV light toward the internal electrode.

In the implant surface modification treatment device according to one embodiment of the present disclosure, which has a simple configuration, since implant surface modification treatment is performed inside a UV lamp having a double tube structure and the entire surface of an implant fixture can be uniformly irradiated with UV light at one time, the time taken for surface modification treatment can be significantly reduced.

Further, in the implant surface modification treatment device according to one embodiment of the present disclosure, since a surface of an implant fixture can be treated in a state in which the implant fixture is kept inside a case through which light passes, the time taken for surface treatment can be reduced, and contamination of the implant fixture that may occur in the surface modification treatment process can be prevented.

-Description of reference numerals-

| | |
|---|---|
| 10: internal electrode | 11: power supply line |
| 12, 21, 31: accommodating space | 13: transmission part |
| 20: ultraviolet (UV) discharge vessel | 22: gas-filled area |
| 30: external electrode | 40: support |
| 41: air vent hole | 50: case |

DETAILED DESCRIPTION

Hereinafter, an implant surface modification treatment device according to the present disclosure will be described in detail with reference to the accompanying drawings.

The embodiments of the present disclosure are provided to more thoroughly describe the present disclosure to a person of ordinary skill in the art. The following embodiments may be modified into various other forms, and the scope of the present disclosure is not limited to the following embodiments. Rather, the embodiments are provided to make the present disclosure more complete and to fully convey the idea of the present disclosure to those of ordinary skill in the art.

The terms used herein are used to describe specific embodiments and are not intended to limit the present disclosure. As used herein, a singular expression may include a plural expression unless the context clearly indicates otherwise. Also, "comprise" and/or "comprising," when used herein, specifies the presence of shapes, numbers, steps, operations, members, elements, and/or groups thereof mentioned herein and does not preclude the presence of or the possibility of adding one or more shapes, numbers, steps, operations, members, elements, and/or groups other than those mentioned. As used herein, the term "and/or" includes any one of the associated listed items and any combination of one or more of the associated listed items.

In the present disclosure, terms such as first and second are used herein to describe various members, areas, and/or portions, but it is obvious that the members, components, areas, layers, and/or portions are not limited by the terms. The terms do not indicate a specific order, top or bottom, or merits or demerits and are only used to distinguish one member, area, or portion from another member, area, or portion. Therefore, a first member, area, or portion, which will be described below, may also be referred to as a second member, area, or portion without departing from the scope of the present disclosure.

Hereinafter, embodiments of the present disclosure will be described with reference to the drawings that schematically illustrate the embodiments of the present disclosure. In the drawings, for example, modifications of the illustrated shapes may be expected according to production techniques and/or tolerances. Therefore, the embodiments of the present disclosure should not be interpreted as being limited to specific shapes of areas illustrated in the drawings and should include, for example, changes in shapes that may occur during production.

Figure 1:
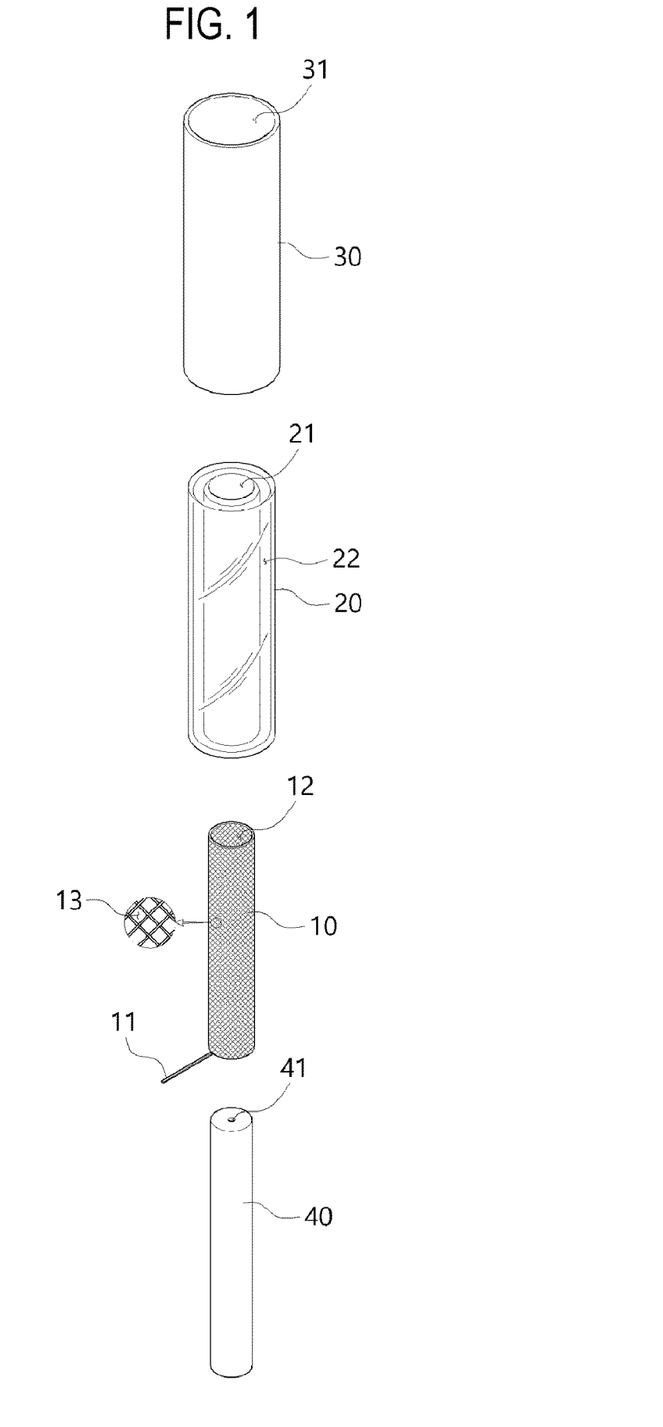
FIG. 1 is an exploded perspective view of an implant surface modification treatment device according to an exemplary embodiment of the present disclosure.
Figure 2:
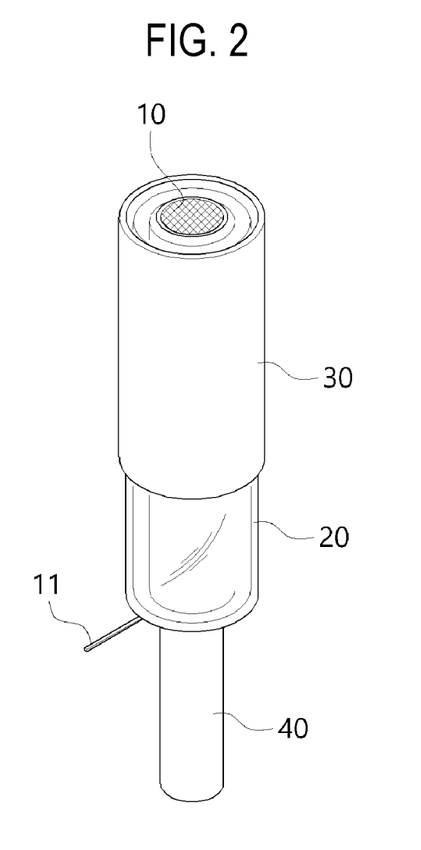
FIG. 2 is a configuration diagram illustrating a combined state of FIG. 1.
Figure 3:
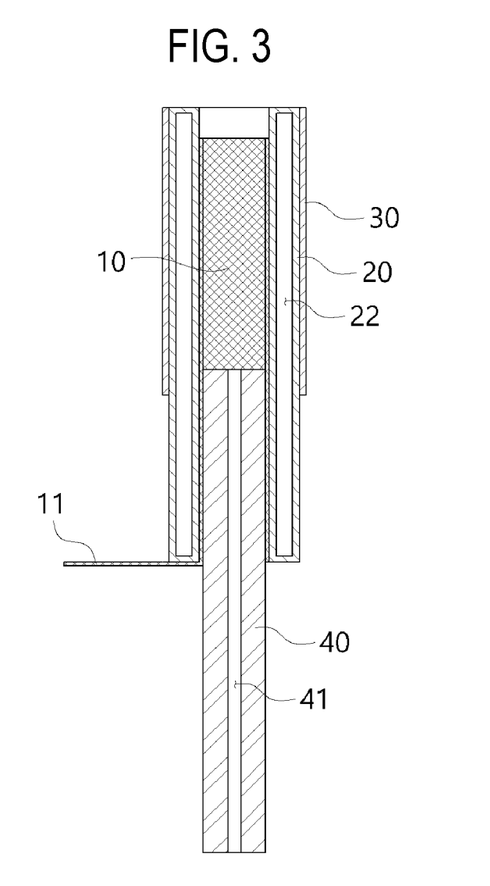
FIG. 3 is a cross-sectional configuration diagram of FIG. 2.

FIG. 1 is an exploded perspective view of an implant surface modification treatment device according to an exemplary embodiment of the present disclosure, FIG. 2 is a view illustrating a combined state of FIG. 1, and FIG. 3 is a cross-sectional configuration diagram of FIG. 2.

Referring to FIGS. 1 to 3, the implant surface modification treatment device according to an exemplary embodiment of the present disclosure includes an ultraviolet (UV) light source (UV lamp) and a support 40. The UV light source includes an UV discharge vessel 20 having a cylindrical structure that has a gas-filled area filled with a discharge gas, an internal electrode 10 accommodated inside the UV discharge vessel 20 and having a surface on which a plurality of light transmission parts are formed, and an external electrode 30 formed on an outer surface of the UV discharge vessel 20. The support 40 is inserted into the internal electrode 10 and having an air vent hole 41 allowing inflow and outflow of air, Hereinafter, the configuration and actions of the implant surface modification treatment device according to an exemplary embodiment of the present disclosure, which is configured as described above, will be described in more detail.

First, the internal electrode 10 has a cylindrical structure in shape, and a power supply line 11 is installed in the internal electrode 10 so that power may be supplied from the outside when the internal electrode 10 is inserted into the UV discharge vessel 20.

An accommodating space 12 is provided inside the internal electrode 10, and as will be described below, surface modification treatment of an implant fixture is performed in a state in which the implant fixture is placed in the accommodating space 12.

As illustrated in each of FIGS. 1 to 3, the internal electrode 10 is formed by weaving a metal wire in a mesh shape so that a plurality of transmission parts 13 are formed.

Figure 4:
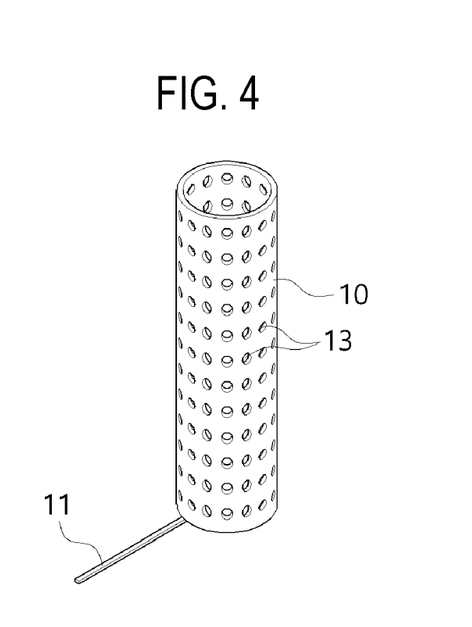
FIGS. 4, 5A and 5B are configuration diagrams of an internal electrode according to different embodiments.

The internal electrode 10 being woven in a mesh shape is one example, and various other structures may be applied. For example, as illustrated in FIG. 4, a plurality of transmission parts 13 may be formed on a surface of a cylindrical structure made of metal by using a method such as punching, or as illustrated in FIGS. 5A and 5B, a plurality of cut-out portions may be formed to form slit-shaped light transmission parts.

Figure 5A:
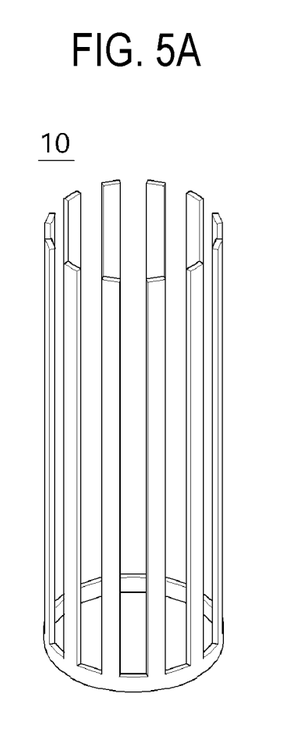
Figure 5B:
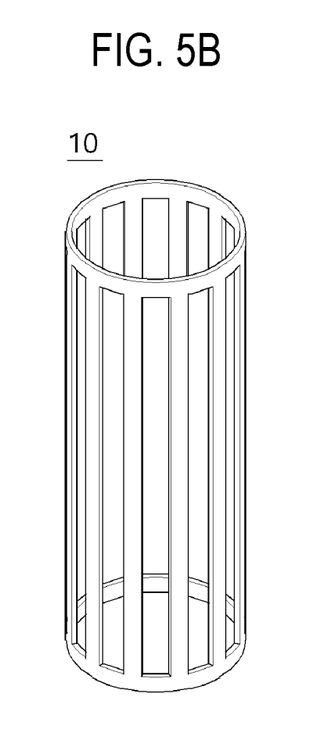

FIG. 5A illustrates a structure in which cut-out portions are formed in a predetermined length from an upper end of a surface so that slits are exposed to the top, and FIG. 5B illustrates a structure in which cut-out portions are only formed in portions of the center. Although not illustrated in the drawings, cut-out portions may also be formed so that a plurality of slits are formed in a circumferential direction in a cylindrical shape.

Further, although the UV discharge vessel 20 of the present disclosure is described herein as having a "cylindrical shape," this is for matching the description with the drawings, and various other "barrel-shaped" structures including a polygonal barrel-shaped structure may also be applied.

The internal electrode 10 and the external electrode 30, which will be described below, are also specified as having a "cylindrical shape," but this is for describing the structures illustrated in the drawings, and the shape of the internal electrode 10 and the external electrode 30 or the method of forming the same are not limited. For example, cut-out portions may be formed in the internal electrode 10 and the external electrode 30 in consideration of the fact that thermal expansion may occur when the UV lamp is turned on, or the internal electrode 10 and the external electrode 30 may be formed in any structure that may be brought into close contact with the inside and outside of the UV discharge vessel 20 by vacuum deposition, screen printing, or the like.

Figure 6A:
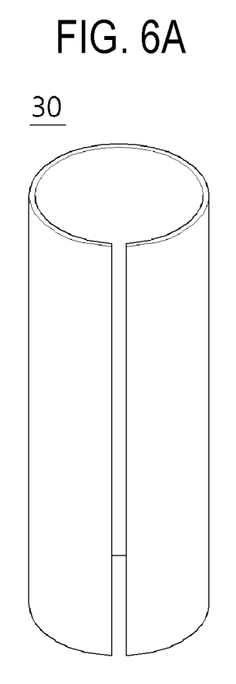
FIGS. 6A and 6B illustrate configuration diagrams of an external electrode according to different embodiments.
Figure 6B:
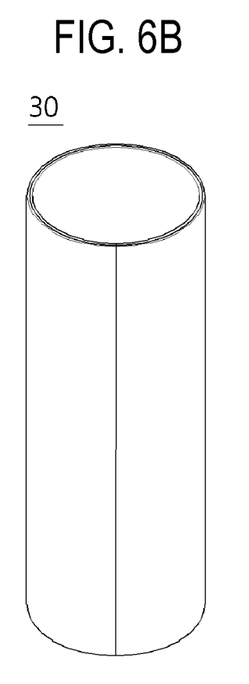

FIGS. 6A and 6B illustrate embodiments of the external electrode 30 having a cut-out outer portion.

The UV discharge vessel 20 has a structure in which a gas-filled area 22 is present between an inner surface of an external tube and an outer surface of an internal tube, and a discharge gas is sealed in the gas-filled area 22. The external electrode 30 is formed on an outer side surface of the external tube of the UV discharge vessel 20, and the internal electrode 10 is formed on an inner side surface of the internal tube. When electrical energy is applied between the internal electrode 10 and the external electrode 30, UV light is generated due to a change in energy of the discharge gas.

As the discharge gas, any discharge gas generating excimer UV light such as Xe (wavelength: 172 nm), ArF (wavelength: 193 nm), KrCl* (wavelength: 222 nm), KrF (wavelength: 248 nm), XeCl (wavelength: 308 nm), and XeF (wavelength: 351 nm), which are shown in Table 1 below, may be used. Other materials that may generate UV light in a UVC wavelength range (100 nm to 280 nm) shown in Table 2 below may be used as the discharge gas. However, it may be necessary to change the electrode structure to which electrical energy is applied (form an electrode in a discharge space) by a person of ordinary skill in the art.

TABLE 1

| Filled gas | Wavelength (nm) | Energy (KJ/mole) |
| --- | --- | --- |
| Xe | 172 | 695 |
| KrCl | 222 | 540 |
| XeCl | 308 | 389 |
| ArF | 193 | 619 |
| KrF | 248 | 485 |
| XeF | 351 | 339 |

TABLE 2

| | |
| --- | --- |
| UV-C | 100 nm~280 nm |
| UV-B | 280 nm~315 nm |
| UV-A | 315 nm~400 nm |

In the present disclosure, as one embodiment, surface modification treatment of an implant fixture may be performed in 5 to 40 seconds using 172 nm excimer UV light.

However, expensive high-purity synthetic quartz glass should be used as a material of the UV discharge vessel 20 in order to emit the 172 nm excimer UV light. Thus, a light source in another wavelength range may also be used to reduce the production cost due to the material of the UV discharge vessel 20. In this case, due to a difference in light energy according to the wavelength, the processing time for surface modification treatment of an implant fixture may increase somewhat.

In the present disclosure, the inner side surface of the internal tube that defines an accommodating space 21 of the UV discharge vessel 20 is brought into close contact with the internal electrode 10.

Next, the external electrode 30 has a barrel-shaped structure having an accommodating space 31 formed inside, and specifically, an inner wall surface of the barrel-shaped structure is preferably mirror-finished to reflect light. Further, the external electrode 30 may be in the form of a thin foil or mesh, or any conductive material that may cause a discharge may be used as the external electrode 30 regardless of shape. However, the barrel-shaped structure may be suitable for increasing the efficiency by reflecting the UV light inward.

The UV discharge vessel 20 may be entirely or partially inserted into the accommodating space 31 of the external electrode 30.

In the present disclosure, in a state in which the internal electrode 10, the UV discharge vessel 20, and the external electrode 30 are combined, electrical energy is supplied to the internal electrode 10 and the external electrode 30 to generate the 172 nm excimer UV light by a change in energy of the discharge gas, and the generated 172 nm excimer UV light is emitted into the accommodating space 12 of the internal electrode 10 through the transmission parts 13 of the internal electrode 10.

At this time, the above-mentioned implant fixture may be placed in the accommodating space 12 to perform surface modification treatment by the 172 nm excimer UV light.

To this end, the support 40 is inserted into the internal electrode 10 to be combined in a state in which the support 40 may reciprocate in a direction in which the support 40 is inserted.

The support 40 may move upward to expose an upper end portion of the support 40 at the top of the structure in which the internal electrode 10, the UV discharge vessel 20, and the external electrode 30 are combined. A holder configured to fix an implant fixture may be provided at the exposed upper end portion of the support 40, and when the support 40 moves downward in a state in which the implant fixture is fixed to the holder, the implant fixture may be inserted into the accommodating space 12 of the internal electrode 10.

The surface modification treatment of the implant fixture is performed with the energy of the UV light and ozone generated due to the UV light.

At this time, since the entire circumference of the implant fixture is irradiated with the UV light, the time taken for surface modification treatment may be significantly reduced, and the configuration of the implant surface modification treatment device may be substantially simplified.

Although an example in which the implant fixture is directly inserted into the accommodating space 12 of the internal electrode 10 has been described above, as illustrated in FIG. 7, a case 50 containing an implant fixture 51 may be inserted into the accommodating space 12, and UV light may pass through the case 50 and perform surface modification treatment to the implant fixture 51 accommodated in the case 50.

Figure 7:
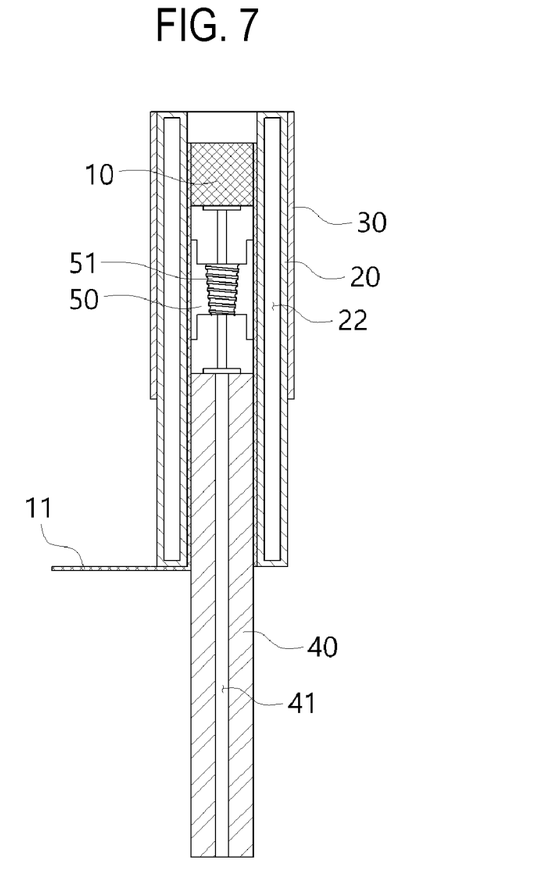
FIG. 7 is a cross-sectional view illustrating a use state of the present disclosure.

The case 50 may be made of a quartz glass material. Specifically, the case 50 may be made of synthetic quartz glass having a transmittance of 60% or higher for UV light having a wavelength of 172 nm when the synthetic quartz glass has a thickness of 1 mm.

In this way, according to the present disclosure, since surface modification treatment of an implant fixture is possible in a state in which the implant fixture is not withdrawn from an implant fixture storage case, contamination of the implant fixture that may occur in the surface modification treatment process can be prevented.

The support 40 may be made of a ceramic material that does not react with UV light and ozone, and the air vent hole 41 having a structure that allows inflow and outflow of air may be provided in the support 40 in the longitudinal direction of the support 40.

The air vent hole 41 allows outside air to enter the inside of the internal electrode 10 or the inside of the case 50 holding the implant fixture. In this way, ozone generation concentration may be adjusted so that the ozone generated due to irradiation of UV light is only present around the implant fixture, that is, in a space where the ozone is necessary.

In some cases, the support 40 may rotate inside the internal electrode.

As described above, according to the present disclosure having a simple configuration, since the entire surface of the implant fixture may be uniformly irradiated with UV light simultaneously inside the UV lamp having a double tube structure, the time taken for surface modification treatment may be significantly reduced.

Also, since surface modification treatment of the implant fixture is possible without withdrawing the implant fixture from the case 50, contamination of the implant fixture can be prevented.

The present disclosure is not limited to the embodiments described above, and it should be apparent to a person of ordinary skill in the art to which the present disclosure pertains that the present disclosure may be embodied by being changed or modified in various ways within the scope not departing from the technical contents of the present disclosure.

INDUSTRIAL APPLICABILITY

The present disclosure relates to surface modification of an artificial tooth using UV light. Based on a natural law that UV light and ozone may be used to remove carbon from a surface of an artificial tooth, the present disclosure is industrially applicable as a technology capable of facilitating artificial tooth placement.

What is claimed is:

1. An implant surface modification treatment device comprising:
   an internal electrode having a barrel-shaped structure and a surface on which a plurality of transmission parts are formed;
   an ultraviolet (UV) discharge vessel having a barrel-shaped structure that accommodates the internal electrode and has a gas-filled area filled with a discharge gas that serves as a UV light source; and
   an external electrode accommodating the UV discharge vessel inside thereof,
   wherein an implant fixture is placed inside the internal electrode to perform surface modification.

2. The implant surface modification treatment device of claim 1, wherein UV light from the UV light source is excimer UV light.

3. The implant surface modification treatment device of claim 1, wherein UV light from the UV light source is excimer UV light having a wavelength of 172 nm.

4. The implant surface modification treatment device of claim 1, wherein UV light from the UV light source is excimer UV light having a wavelength of 222 nm.

5. The implant surface modification treatment device of claim 1, wherein the UV light source is a UV light source of a UVC wavelength range.

6. The implant surface modification treatment device of claim 1, wherein the implant fixture is accommodated in a case through which UV light from the UV light source passes.

7. The implant surface modification treatment device of claim 6, wherein the case is made of a synthetic quartz glass material having a transmittance of 60% or higher for UV light having a wavelength of 172 nm when the synthetic quartz glass material has a thickness of 1 mm.

8. The implant surface modification treatment device of claim 1, further comprising:
   a support inserted into the internal electrode to support the implant fixture.

9. The implant surface modification treatment device of claim 8, wherein the support reciprocates inside the internal electrode to allow the implant fixture to be inserted into or discharged from the internal electrode.

10. The implant surface modification treatment device of claim 8, wherein the support rotates inside the internal electrode.

11. The implant surface modification treatment device of claim 8, wherein the support has an air vent hole allowing inflow and outflow of air.

12. The implant surface modification treatment device of claim 8, wherein the support is made of a ceramic material.

13. The implant surface modification treatment device of claim 1, wherein the external electrode has a barrel-shaped structure that reflects generated UV light toward the internal electrode.

14. The implant surface modification treatment device of claim 10, wherein the support is made of a ceramic material.

15. An implant surface modification treatment device comprising:
   an internal electrode having a barrel-shaped structure and a surface on which a plurality of transmission parts are formed;

an ultraviolet (UV) discharge vessel formed outside of the internal electrode and having a gas-filled area filled with a discharge gas that serves as a UV light source;
an external electrode; and
a support configured to support an implant fixture and reciprocate inside the internal electrode to allow the implant fixture to be inserted into or discharged from the internal electrode,
wherein the implant fixture is placed inside the internal electrode to perform surface modification.

16. The implant surface modification treatment device of claim 15, wherein UV light from the UV light source is excimer UV light having a wavelength of 172 nm.

17. The implant surface modification treatment device of claim 15, wherein the external electrode is formed outside of the UV discharge vessel.

* * * * *